UNITED STATES PATENT OFFICE 2,003,940

HIGH SPEED BOTTLE MAKING PROCESS

Henry W. Ingle, Windsor, Conn., assignor to Hartford-Empire Company, Hartford, Conn., a corporation of Delaware No Drawing. Application January 22, 1932, Serial No. 588,237

7 Claims. (Cl. 49—80)

The present invention relates to the manufacture of hollow glassware, such as bottles, and comprises a novel process of producing such ware at high speeds by substantially reducing the time during which the glass forming each article is in contact with the molds usually used in such manufacture.

Heretofore in the manufacture of bottles with given equipment, the glass time cycle (i. e. the combined time of blank mold contact, reheat, and blow mold contact) for a particular bottle has been considered as substantially constant. While it has been understood that the same bottle may be manufactured by the application of cycles of slightly different lengths, the shortest cycle for a particular bottle which has heretofore been considered feasible has been one at which slight further decrease thereof would result in the production of ware which would not be self-supporting when removed from the blow mold. Such cycle may be referred to as the "former commercial cycle".

I have discovered that while slight or moderate decreases in the length of the former commercial glass time cycle render the bottles produced non-self supporting when removed, or, as the art terms it, causes "squatting" of the bottles, decided and substantial decreases in the glass time cycle or, otherwise expressed, increases in the speed of production per mold again result in ware which is of excellent quality and is self-supporting when removed from the final mold.

In other words, I have discovered that there exists not one, but two zones of speeds of mold operation at which good bottles may be made by the same mold equipment, which zones are separated by a zone in which such bottles cannot be made. The positions and extents of these zones may vary with bottles of different weight and type, but I believe that the discovery is applicable to bottles of all weights and of all types and that for every bottle or similar article these zones exist.

For convenience, the zones may be termed the "lower effective zone", the "dead zone", and the "upper effective zone" respectively. Their existence probably results from what appears to be the somewhat paradoxical heat extracting action of the molds at different temperatures. When hot glass is delivered to a relatively cold mold, the glass contiguous to the mold wall is rapidly chilled and a hard exterior layer or skin of colder glass is formed adjacent the mold walls. This skin acts as an insulator and greatly retards the passage of heat from the interior glass to the mold.

So long as there is a colder and more substantial skin formation caused at the time of delivery of glass to the mold, the time required for the necessary softening of the harder glass is lengthened. Thus attempts to speed up operation and thence to slightly decrease the length of the glass time cycle result in an inadequate extraction of heat units from the interior glass, so that at these higher speeds the bottles have tended to "squat" when removed from the final mold. This skin forming tendency also has required a substantial period between the contact of the glass with the first or blank mold and with the second or blow mold, known as the "reheat period", during which the skin formed in the blank mold is softened by the heat of the interior glass.

Apparently, at about the highest speed that has heretofore been commercially used for a particular bottle, and at speeds slightly higher, the condition of the molds heretofore used has been such that on the receipt of the charge a substantial skin has been formed and hence at these slightly increased speeds insufficient heat has been extracted by the time the bottle is removed from the last mold for that bottle to set to an extent that it is self-supporting.

If the machine is run at speeds substantially higher than the former commercial speed, or if other special provisions be made for continuously keeping the molds at relatively high temperatures, the skin formation is so far reduced that the removal of heat from the interior glass is much more rapid, in spite of the higher initial mold temperature. Also the reduction of the skin formation greatly lessens the period required for reheat and results in a lessening of the time required for each portion of the glass time cycle. This effect is obtained by "jumping the dead zone", which apparently is a zone in which there is still sufficient skin formation to retard the passage of heat from the interior glass to such an extent that the time allowed for mold contact and reheat is insufficient for the extraction of sufficient heat from the glass so that the completely formed article is self-sustaining upon removal from the last mold.

Briefly stated, prior experience has taught that an increase in the speed of a machine (and hence a decrease in the glass time cycle) beyond that generally used in the commercial manufacture of any particular bottle has resulted in "squatting" and poor ware, and is hence to be avoided. My discovery is that increase of speed should not be avoided, but should be emphasized, provided the increase is sufficient to carry the operation beyond the "dead zone".

The principal object of this invention, therefore, is to provide a novel process of manufacturing hollow glassware in molds by application of a glass time cycle of length equal to or less than one, an increase of which would result in ware which would be deformed when removed from the final mold. As applied to a particular machine, it is a process of producing ware at or above a speed of production per mold below which the ware would "squat".

This process may be carried out as to any particular bottle upon any suitable forming machine, irrespective of the manner in which the glass is supplied thereto and irrespective of its character and irrespective of whether it be a stationary or rotary, single table or plural table machine.

The machine which I believe is now best fitted to carry out the process of my present invention is of the type shown by my United States Patents Nos. 1,843,160, and 1,911,119, dated Feb. 2, 1932 and May 23, 1933, respectively. This type of machine is commonly referred to as the Hartford-Empire Individual Section machine. This machine has so few and such light moving parts and is so flexible that it may readily be operated to produce a wide range of ware at widely varying speeds, including speeds in the upper effective zone for a wide range of bottles.

As an example of the utility of my novel process, attention may be called to the following instances of operations carried out by the aforesaid individual section machine under my direction:

1. A certain narrow neck bottle weighing ⅞ oz. was being made commercially in given molds at a speed of 51.4 bottles per minute. An attempted increase in the speed of the operation to 54.6 per minute resulted in the "squatting" of the bottles produced. I therefore increased the speed of operation to 63.5 per minute, an increase of about 23.6% over previous commercial speeds, with the result that excellent ware which was thoroughly self-supporting was made.

2. Similarly, a different bottle weighing 1¾ oz. was being made commercially at a speed of 28 bottles per minute. When this speed was increased to 32 per minute, the bottles went out of shape; while an increase to 44 per minute or substantially 57% resulted in excellent bottles.

3. With a 6¼ oz. bottle of still different type, the commercial speed being 25 per minute, the dead zone was found to have been jumped and excellent ware made at 33 per minute, an increase of about 32% over previous commercial speeds. At intermediate speeds of 27.2 articles per minute and 28.1 articles per minute good ware could not be made.

The foregoing three examples were made under my personal direction and observation in a plant operating otherwise in the ordinary manner in the manufacture of commercial articles.

4. Again, with a still different type of bottle weighing 8¼ oz. the previous commercial speeds of which were between 22 and 23 per minute, super-speeds of 27.2 to 28.1 or an increase of about 23.6% were found not only to increase the production, but to result in excellent ware. This example of my novel process was not made in my presence but was made according to instructions from me in a commercial plant manufacturing glassware. I am satisfied that at intermediate speeds between previous commercial speeds and the super-speeds at which the machine was operated under my instruction, that good ware could not be made.

Thus in every case, the percentage increase in speed is greater than 20. Increases in speed of this order of magnitude over standard commercial practice, which standard practice has now become quite definite for any given type and weight of bottle with a given machine, may be expected by the use of my novel process.

In each instance, not only was more ware made in a given time, but the quality of the ware so made was superior to that made in the lower effective zone.

The foregoing results have been expressed in terms of increased speed of production for a particular machine, as it is obvious that the greatest commercial utility of my invention resides in the increased production per mold per minute. Thus, the invention permits the use of smaller machines with less mold and other equipment to make a given production, or the use of the same equipment at higher speeds to obtain a greatly increased production.

As a practical matter, my novel process is best carried out on a machine which, like the individual section machine above referred to, is so constructed as to permit a largely overlapping cycle of operations of the blank and corresponding blow molds, as such a machine permits a fairly continuous glass containing use of all of its molds, and hence such mold equipment may be so used that the interior of the molds may be maintained at all times within a narrow range, the lowest point of which is relatively high. Thus the mold temperature at the time of initial glass contact therewith is such as to minimize skin formation. Maintenance of mold temperatures within such range is particularly important in the practical application of my method, as the mold at the time of charging should be at a sufficiently high temperature to minimize the aforementioned skin formation.

When operating at high speeds, that is, speeds materially above those which have been and now are in general use in commercial factories, the additional amount of glass introduced into each mold per unit of time introduces a larger amount of heat into the mold per unit of time, which has several results. In the first place, the mold is maintained at a relatively higher average temperature than when operated at slower speeds. The heat loss from the outside of the mold by radiation is also somewhat higher due to the higher temperature of the outside of the mold. The higher average mold temperature may be attributed also to the fact that the inactive periods of the mold, that is, the time during which the mold is out of contact with hot glass, are shortened, thus shortening the time during which the mold can cool. This in effect produces a condition in which the mold never is permitted to cool to as low a temperature as in previous commercial practice. The result is that the mold walls used for contact with glass are at a relatively higher temperature than heretofore upon the initial contact of glass therewith, so that there is no possibility of forming a substantial insulating skin, as compared with the previous commercial practice. Therefore, there is much more rapid heat transfer from the glass to the mold than heretofore. This increased rate of heat transfer thus provided enables the molds when operated according to my novel method to extract the necessary amount of heat from the glass in a much shorter period of time such as is afforded by the higher speed operation. Thus the lack of skin or the minimum skin formed during the practice of my present process is not to be confused with the skin formed according to previous practices, wherein the necessity was to provide in each mold sufficient glass-contact time for the transmission of heat through the insulating skin, rather than to provide for the transmission of substantially the same amount of heat from the glass to the mold without passing through a substantial insulating skin.

In any case, it is always necessary to maintain the mold walls below a temperature such that glass would "wet" or adhere thereto, this "wetting" temperature being for some ordinary glasses substantially 1100° F.

Thus while in prior practices blank molds, for example, have been used at a speed and according to a cycle such that the glass-contacting inner walls of the blank molds probably fell to a temperature of 600° before glass was again brought into contact therewith, according to my present invention this temperature of the blank mold walls is probably little if any less than 800° F.

It has been found when operating according to my present methods that the blow molds of the forming machine are maintained within the temperature limits herein set forth and claimed, specifically between a lower limit such that the contact of glass with the mold will not result in the formation of a skin of such heat insulating characteristics as would prevent the extraction of the necessary amount of heat in the time permitted and an upper limit immediately below the point at which glass will adhere to the mold. This is evidenced by the fact that the interior walls of the blow molds appear cherry red immediately upon the opening thereof to expose a completed article and do not lose all their color prior to their reclosing about the next succeeding parison placed therein. As contrasted with this, the prior art practice resulted in the blow molds operating in such a manner that the inner walls thereof became black prior to their again being closed about the next succeeding parison.

For the best practice of my method I would recommend the use of relatively heavy mold equipment and the fairly continuous glass contacting use of all the molds, though my process is not necessarily limited to the use of such heavy mold equipment, but may be considered of general application. Other expedients may be resorted to to maintain operating conditions such that my process may be employed.

Variation in the actual position and extents of the several zones may exist dependent upon a number of different factors, as for example variation in mold weights, etc. However, this does not change the fact that my invention is basic and of general application.

I claim:

1. The process of making glass ware in molds which comprises subjecting molten glass to contact with mold surfaces for periods of time of less length than a period of contact which would result in ware which would deform when finally removed from the mold contact, and during the contact period provided extracting sufficient heat from the glass so that the articles when removed from contact with said mold surfaces are self-sustaining.

2. The process of continuously making bottles at a speed and according to a cycle such that there is a lower range of speed of formation of the bottles, other factors of the cycle being the same in character and proportion, in which the bottle after the bottle making process is completed would be deformed due to insufficient extraction of heat during said bottle making process, the articles being formed at a speed greater than any in said lower range.

3. The process of making glassware in the molds of an automatic glass forming machine which comprises operating the machine at or above a speed of production, the reduction of which would result in ware which would deform when removed from the molds, periodically bringing molten glass charges into contact with the molds, forming each charge into an article of ware by contact with the molds, and extracting sufficient heat from each article while in the molds that the article when removed will be self-sustaining.

4. The process of continuously making glass articles in molds which comprises supplying glass charges periodically to molds and subjecting the successive charges of molten glass to "glass time cycles" within the "upper effective zone".

5. The method of forming glassware at high speed in an automatic glass forming machine which comprises periodically supplying charges of glass to forming molds of the machine, shaping said charges into articles of the desired form therein and extracting sufficient heat therefrom in the short period of time afforded by the high speed of the machine that the articles be self-sustaining when removed from the machine, and maintaining the temperature of the interior of the molds throughout the operations within a narrow zone, the lower limit of which is such that the contact of glass with the mold at such temperature will not result in the formation of a skin of such heat insulating characteristics as would prevent the extraction of the necessary amount of heat aforesaid, and the upper limit of which is immediately below the point at which glass will adhere to the molds, whereby the maintained temperature of the mold walls used for glass contact provides a high rate of heat transfer permitting the extraction in the small amount of time afforded by the high speed of the machine of the necessary amount of heat from the glass.

6. The process of continuously making bottles at a speed and according to a cycle such that there is a lower range of speed of formation of the bottles, other factors of the cycle being the same in character and proportion, in which the bottle after the bottle making process is completed would be deformed due to insufficient extraction of heat during said bottle making process, the articles being formed at a speed greater than any in said lower range, comprising the steps of forming the bottle in successive steps including shaping in at least two successively applied molds in each of which heat is extracted from the glass, and during the entire bottle making process extracting sufficient heat from the glass so that the bottle upon completion of the process will be self-sustaining.

7. The method of forming glass ware at high speed in an automatic glass forming machine, which comprises periodically supplying charges of glass to blank molds on the machine, forming the charges into blanks therein, transferring the blanks thus formed to blow molds, blowing the blanks to final form therein, and maintaining the blow molds in an elevated temperature range, the lower limit of which is such that the contact of glass with the blow molds at such temperature will not result in the formation of a skin of such heat insulating characteristics as would prevent the extraction of the necessary amount of heat in the time afforded and the upper limit of which is immediately below the point at which glass will adhere thereto, whereby the maintained temperature of the walls of the blow molds used for glass contact provides a high rate of heat transfer permitting extraction in the small amount of time afforded by the high speed of the machine of the necessary extent that it is self-supporting.

HENRY W. INGLE.

CERTIFICATE OF CORRECTION.

Patent No. 2,003,940. June 4, 1935.

HENRY W. INGLE.

It is hereby certified that error appears in the printed specification of the above numbered patent requiring correction as follows: Page 4, second column, line 10, claim 7, for "extent that it is self-supporting" read amount of heat from the glass; and that the said Letters Patent should be read with this correction therein that the same may conform to the record of the case in the Patent Office.

Signed and sealed this 16th day of July, A. D. 1935.

(Seal)

Leslie Frazer
Acting Commissioner of Patents.